United States Patent [19]

Stoltman

[11] Patent Number: 4,463,735

[45] Date of Patent: Aug. 7, 1984

[54] DUAL FUEL SUPPLY SYSTEM

[75] Inventor: Donald D. Stoltman, Henrietta, N.Y.

[73] Assignee: General Motors Corporation, Detroit, Mich.

[21] Appl. No.: 500,372

[22] Filed: Jun. 2, 1983

[51] Int. Cl.³ .............................................. F02B 43/00
[52] U.S. Cl. ...................................... 123/525; 123/575
[58] Field of Search ................ 123/525, 526, 575–578; 261/16, 18 B, 28; 137/112, 113, 206

[56] References Cited

U.S. PATENT DOCUMENTS

| 2,675,793 | 4/1954 | Ziege | 123/575 |
| 2,922,407 | 1/1960 | Lee | 123/575 |
| 3,577,877 | 5/1971 | Warne | 123/526 |
| 4,031,864 | 6/1977 | Crothers | 123/1 A |
| 4,353,345 | 10/1982 | Ebihara | 123/575 |

Primary Examiner—William A. Cuchlinski, Jr.
Attorney, Agent, or Firm—C. K. Veenstra

[57] ABSTRACT

A dual fuel supply system for an automotive engine has a fuel tank adapted to contain both methane and propane at pressures up to 17,000 kPa. A switching valve assembly directs methane to the engine fuel metering apparatus when the fuel tank pressure exceeds 1400 kPa and directs propane to the engine fuel metering apparatus when the fuel tank pressure is less than 1400 kPa.

1 Claim, 1 Drawing Figure

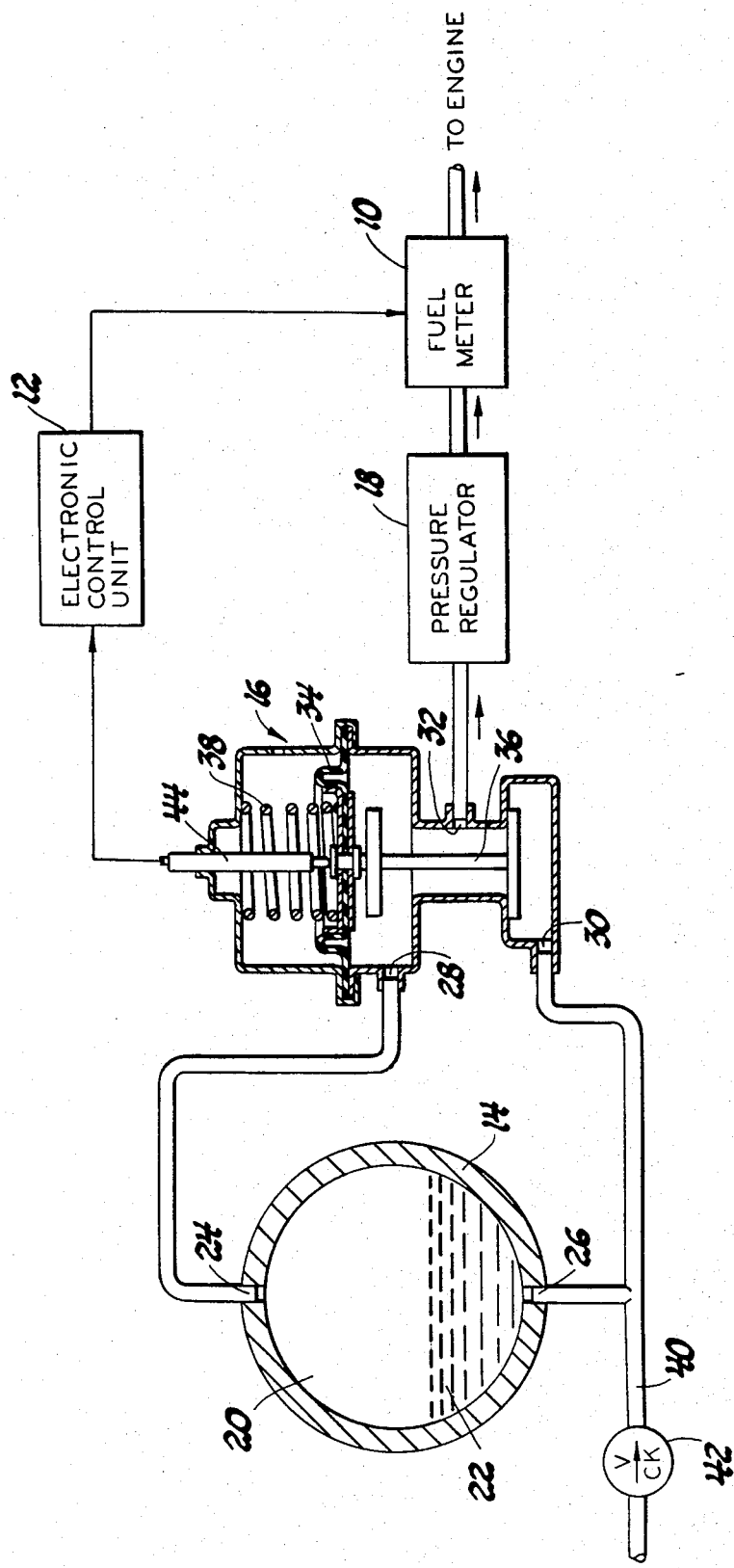

4,463,735

DUAL FUEL SUPPLY SYSTEM

TECHNICAL FIELD

This invention provides a dual fuel supply system for an engine adapted to operate on fuels such as methane and propane.

BACKGROUND

Methane (natural gas) is a readily available, relatively low cost fuel in some locations and can be used to fuel automotive engines. However, methane does not provide the range of operation provided by other fuels such as propane, and in some locations methane is not as readily available as other fuels such as propane.

SUMMARY OF THE INVENTION

This invention provides a dual fuel system suitable for supplying fuels such as methane and propane to an automotive engine.

In a dual fuel system according to this invention, a fuel tank is adapted to contain both a principal vapor phase fuel such as methane and a primarily liquid phase fuel such as propane without any barrier between the two fuels. At some times the vapor phase fuel is supplied to the engine fuel metering apparatus for delivery to the engine, while at other times the liquid phase fuel is supplied to the fuel metering apparatus for delivery to the engine. The fuel metering apparatus senses whether a vapor phase fuel or a liquid phase fuel is being supplied and adjusts the fuel delivery to the engine to provide the fuel flow required for proper engine operation.

In such a system, of course, some of the liquid phase fuel will vaporize and mix with the principal vapor phase fuel. If the vapor from the primarily liquid phase fuel should constitute a significant portion of the vapor phase fuel mixture, it would be necessary for the fuel metering apparatus to compensate the fuel delivery for the partial volume of the vapor from the primarily liquid phase fuel to assume proper engine operation.

The partial volume occupied by the vapor from the primarily liquid phase fuel varies with the pressure in the tank, and at elevated pressures that partial volume becomes small enough to be ignored by the fuel metering apparatus. For example, in a fuel tank containing both methane and propane according to this invention, the partial volume of the propane vapor is small enough to be considered insignificant when the pressure exceeds 1400 kPa.

At fuel tank pressures above 1400 kPa, therefore, the dual fuel supply system may supply the vapor phase fuel mixture to the engine fuel metering apparatus and the fuel metering apparatus may deliver the fuel to the engine without compensation for the partial volume of propane. At fuel tank pressures below about 1400 kPa, the fuel supply system should supply propane to the engine fuel metering apparatus to avoid the necessity of compensation for the varying partial volumes of two vapor phase fuels.

Thus in a dual fuel supply system according to this invention, a switching valve assembly responsive to the pressure in the fuel tank directs the vapor phase fuel from the top of the tank to the fuel metering apparatus when the fuel tank pressure exceeds a pressure permitting a selected, very low partial volume of vapor from the primarily liquid phase fuel. The switching valve assembly directs the liquid phase fuel from the bottom of the tank to the fuel metering apparatus when the fuel tank pressure is less than the pressure permitting the selected, very low partial volume of vapor from the primarily liquid phase fuel.

The details as well as other features and advantages of a preferred embodiment of this invention are set forth in the remainder of the specification and are shown in the accompanying drawing.

SUMMARY OF THE DRAWING

The sole FIGURE of the drawing schematically illustrates a preferred embodiment of the dual fuel supply system provided by this invention.

THE PREFERRED EMBODIMENT

Referring to the drawing, fuel metering apparatus 10 is controlled by an electronic control unit 12 to deliver fuel in a desired manner to an automotive internal combustion engine. While this invention may be used with various kinds of fuel metering apparatus, it is contemplated that this invention will be employed with throttle body injection apparatus which has an electromagnetic injector delivering timed pulses of fuel to an engine induction passage at a location above the throttle.

Fuel is supplied to fuel metering apparatus 10 from a fuel tank 14 through a switching valve 16 and a pressure regulator 18. Fuel tank 14 may contain either a vapor phase fuel such as methane or a primarily liquid phase fuel such as propane, or as shown in the drawing, fuel tank 14 may contain both methane in the upper portion 20 and propane in the lower portion 22.

The upper portion 20 of fuel tank 14 has an upper outlet 24 for discharging the methane or other vapor phase fuel, and the lower portion 22 of fuel tank 14 has a lower outlet 26 for discharging the propane or other primarily liquid phase fuel.

Switching valve assemby 16 has a vapor phase fuel inlet port 28 connected to upper outlet 24 and a liquid phase fuel inlet port 30 connected to lower outlet 26. Switching valve assembly 16 also has a discharge port 32 directing fuel through pressure regulator 18 to fuel metering apparatus 10. In addition, switching valve assembly 16 has a diaphragm 34 responsive to the fuel pressure in vapor phase fuel inlet port 28 and thus to the fuel pressure in tank 14. Diaphragm 34 positions a double ended valve 36 so that valve 36 interrupts liquid phase fuel flow from inlet port 30 to discharge port 32 and directs vapor phase fuel from inlet port 28 to discharge port 32 when the fuel pressure in fuel tank 14 exceeds a selected pressure—about 1400 kPa when the fuels are methane and propane. Below 1400 kPa, a biasing spring 38 causes diaphragm 34 to position valve member 36 to interrupt the vapor phase fuel flow from inlet port 28 to discharge port 32 and to direct liquid phase fuel from inlet port 30 to discharge port 32.

The 1400 kPa switching level for switching valve assembly 16 has been selected because at that pressure the partial volume of propane vapor is sufficiently small that it may be ignored in the operation of fuel metering apparatus 10 (or may be compensated by conventional closed loop operation of fuel metering apparatus 10). The switching level may be varied to suit different applications and will certainly be different if a principal vapor phase fuel other than methane or a primarily liquid phase fuel other than propane is employed in this invention.

Fuel tank 14 may be filled through a line 40 containing a check valve 42. Propane may be added to the tank when the pressure in tank 14 is less than 1400 kPa; methane may be added to the tank when the pressure is less than 17,000 kPa. Switching valve assembly 16 delivers vapor phase fuel—primarily methane—through pressure regulator 18 to fuel metering apparatus 10 whenever the pressure in fuel tank 14 exceeds 1400 kPa; pressure regulator 18 reduces that pressure to 350 kPa for delivery by fuel metering apparatus 10. Switching valve assembly 16 delivers liquid phase fuel—propane—through pressure regulator 18 to fuel metering apparatus 10 whenever the pressure in fuel tank 14 is less than about 1400 kPa; pressure regulator 18 reduces that pressure to 350 kPa for delivery by fuel metering apparatus 10. Pressure regulator 18, and/or switching valve assembly 16, may include means for heating the propane to assure vaporization prior to the time the propane reaches fuel metering apparatus 10.

Switching valve assembly 16 includes an electrical switch 44 actuated by diaphragm 34. Switch 44 is closed when diaphragm 34 directs vapor phase fuel to fuel metering apparatus 10 and opens when diaphragm 34 positions valve member 36 to direct liquid phase fuel to fuel metering apparatus 10. Switch 44 is connected in circuit with electronic control unit 12 and causes electronic control unit 12 to adjust the operation of fuel metering apparatus 10 to provide the fuel flow required by the engine.

The dual fuel supply system provided by this invention accordingly supplies liquid phase fuel to the engine fuel metering apparatus when the fuel tank pressure is below a level at which the partial volume of the vapor from the primarily liquid phase fuel significantly affects the composition of the vapor phase fuel and creates the need for compensation of the fuel delivery. The dual fuel supply system provided by this invention preferentially supplies vapor phase fuel to the engine fuel metering apparatus when the fuel tank pressure is above that level. It will be appreciated, of course, that various other controls may be added to this dual fuel supply system; such controls, for example, could allow the operator to specify operation on the liquid phase fuel even though vapor phase fuel is available at adequate pressure.

The embodiments of the invention in which an exclusive property or privilege is claimed are defined as follows:

1. A dual fuel supply system for an engine having a fuel metering apparatus, said system comprising a fuel tank adapted to contain a principal vapor phase fuel and a primarily liquid phase fuel, said fuel tank having an upper outlet for discharging vapor phase fuel and a lower outlet for discharging liquid phase fuel, and a switching valve assembly having a vapor phase fuel inlet port connected to said upper tank outlet and a liquid phase fuel inlet port connected to said lower tank outlet and a discharge port adapted to direct fuel to said fuel metering apparatus, said switching valve assembly also having a diaphragm responsive to the fuel pressure in said tank and a valve member positioned by said diaphragm for directing fuel from said vapor phase fuel inlet port to said discharge port and obstructing flow from said liquid phase fuel inlet port to said discharge port when said fuel pressure exceeds the pressure permitting a selected partial volume of vapor from said liquid phase fuel and for directing fuel from said liquid phase fuel inlet port to said discharge port and obstructing flow from said vapor phase fuel inlet port to said discharge port when said fuel pressure is less than the pressure permitting said selected partial volume of vapor from said liquid phase fuel.

* * * * *